(12) United States Patent
Yang et al.

(10) Patent No.: US 10,745,584 B2
(45) Date of Patent: Aug. 18, 2020

(54) TWO-COMPONENT POLYURETHANE TOPCOAT

(71) Applicant: VALSPAR SOURCING, INC., Minneapolis, MN (US)

(72) Inventors: Fan Yang, Shanghai (CN); Zhai Zhou, Shanghai (CN); Wanjun Xu, Shanghai (CN)

(73) Assignee: Valspar Sourcing, Inc., Minneapolis, MN (US)

( * ) Notice: Subject to any disclaimer, the term of this patent is extended or adjusted under 35 U.S.C. 154(b) by 34 days.

(21) Appl. No.: 16/162,830

(22) PCT Filed: Apr. 17, 2017

(86) PCT No.: PCT/US2017/027935
§ 371 (c)(1),
(2) Date: Oct. 17, 2018

(87) PCT Pub. No.: WO2017/184511
PCT Pub. Date: Oct. 26, 2017

(65) Prior Publication Data
US 2019/0161639 A1    May 30, 2019

(30) Foreign Application Priority Data

Apr. 19, 2016  (CN) .......................... 2016 1 0243963

(51) Int. Cl.
| | | |
|---|---|---|
| *C09D 175/04* | (2006.01) |
| *C09D 7/47* | (2018.01) |
| *C08G 18/42* | (2006.01) |
| *C09D 7/65* | (2018.01) |
| *C09D 7/41* | (2018.01) |
| *C08L 33/04* | (2006.01) |
| *C08L 67/00* | (2006.01) |
| *C08L 83/04* | (2006.01) |
| *C08G 18/62* | (2006.01) |
| *C08G 18/40* | (2006.01) |
| *C08G 18/76* | (2006.01) |

(52) U.S. Cl.
CPC ....... *C09D 175/04* (2013.01); *C08G 18/4063* (2013.01); *C08G 18/42* (2013.01); *C08G 18/6225* (2013.01); *C08G 18/7664* (2013.01); *C09D 7/41* (2018.01); *C09D 7/47* (2018.01); *C09D 7/65* (2018.01); *C08L 33/04* (2013.01); *C08L 67/00* (2013.01); *C08L 83/04* (2013.01); *C08L 2205/03* (2013.01)

(58) Field of Classification Search
CPC .......... C09D 175/04; C09D 7/65; C09D 7/47; C09D 7/41; C08G 18/4063; C08G 18/42; C08G 18/6225; C08G 18/7664; C08L 33/04; C08L 67/00; C08L 83/04; C08L 2205/03
USPC ........................................................ 524/589
See application file for complete search history.

(56) References Cited

U.S. PATENT DOCUMENTS 6,472,493 B1 * 10/2002 Huynh-Ba .......... C08G 18/0852
525/123
8,563,648 B2    10/2013 Schmeltzer et al.

FOREIGN PATENT DOCUMENTS

| CN | 102093810 A | 6/2011 |
|---|---|---|
| CN | 103497604 | 1/2014 |
| EP | 2621982 | 7/2014 |
| JP | 2002275415 | 9/2002 |
| JP | 2008201842 | 9/2008 |
| JP | 2011516660 | 5/2011 |
| JP | 2013139508 | 7/2013 |
| WO | 2009123684 | 10/2009 |

OTHER PUBLICATIONS

Search Report and Written Opinion for international appl. No. PCT/US2017/027935, dated Jul. 30, 2017 (9 pages).
Extended search report from European patent appl. No. 17786412.1, dated Aug. 28, 2019 (4 pages).
Notice of Rejection issued for Japanese appl. No. 2018-555155, dated Jan. 7, 2020 (15 pages, including English translation).

* cited by examiner

*Primary Examiner* — William K Cheung

(57) ABSTRACT

The present disclosure is directed to a two-component polyurethane topcoat, comprising: a) a film-forming resin composition comprising i) an active hydrogen-containing polymer, having a hydroxyl value of 70 mg KOH/g polymer or more; ii) a polyester resin, having a hydroxyl value of less than 50 mg KOH/g resin and a viscosity of less than 6000 mPa·s at 25° C.; and iii) a package of flatting agents comprising a polysiloxane containing an effective silicon content of 30 wt % or more and an acrylics polymer having a weight average molecular weight in the range of 6,000 to 20,000 g/mol, wherein the weight ratio of the polysiloxane to the acrylics polymer is in the range of 1:5 to 1:15; and b) a polyisocyanate curing agent, wherein the ratio by weight of the component a) to the component b) is in the range of 100:10 to 100:25.

17 Claims, No Drawings

TWO-COMPONENT POLYURETHANE TOPCOAT

This Application is a § 371 national stage filing of International Application No. PCT/US2017/027935, filed Apr. 17, 2017, which claims priority to Chinese Patent Application No. CN201602439633, filed Apr. 19, 2016, and entitled "Two-Component Polyurethane Topcoat," which is incorporated herein by reference in its entirety.

TECHNICAL FIELD

The present disclosure relates to a two-component polyurethane topcoat, more particularly a two-component polyurethane topcoat having high gloss and high distinctness of image (DOI).

BACKGROUND

Polyurethane topcoat, also abbreviated as PU topcoat is widely used for coating industry. It is known that polyurethane topcoat after curing may provide a coating having good adhesion to its underlying coating such as epoxy primer coating and having good weatherability, corrosion resistance and high gloss. Therefore, polyurethane topcoat is basically suitable for all application fields of industrial paint and thus its need may reach up to one or more million tons per year.

Taking into account actual use, gloss of polyurethane topcoat is one of factors determining its application field. At present, the prior polyurethane topcoat after cured usually produce a coating exhibiting a gloss of at most 70% at 20°. Apparently, this kind of PU topcoat is not sufficient to achieve the requirement to advanced paints such as vehicle finish paint. In practice, PU topcoat is desired to exhibit a gloss of at least 80% at 20° to ensure that is may be suitable for applying metal substrate. It is known that flatting performance of PU topcoat plays an important role in achieving its decorative effect, especially gloss. The PU topcoat having good flatting performance may produce a coating having high gloss, high DOI and fullness. In contrast, the PU topcoat having poor flatting performance after film-forming will form undesired coating with peel structure exhibiting obvious ripple.

There is still a need for polyurethane topcoat having excellent flatting performance and producing a coating exhibiting high gloss and high DOI.

SUMMARY

The present disclosure provides a two-component polyurethane topcoat, comprising a) a film-forming resin composition comprising i) an active hydrogen-containing polymer, having a hydroxyl value of 70 mg KOH/g polymer or more; ii) a polyester resin, having a hydroxyl value of less than 50 mg KOH/g resin and a viscosity of less than 6000 mPa·s at 25° C.; and iii) a package of flatting agents comprising a polysiloxane containing an effective silicon content of 30 wt % or more and an acrylics polymer having a weight average molecular weight in the range of 6,000 to 20,000 g/mol, wherein the weight ratio of the polysiloxane to the acrylics polymer is in the range of 1:5 to 1:15; and b) a polyisocyanate curing agent, wherein the ratio by weight of the component a) to the component b) is in the range of 100:10 to 100:25.

According to the present disclosure, the film-forming resin composition further comprises a mixture of solvents each of which has a relative volatile rate in the range of 0.4 to 1.0, relative to butyl acetate.

According to the present disclosure, incorporation into the film-forming resin composition, a combined resin system comprising a polyester resin having a low hydroxyl value and a low viscosity and an active hydrogen-containing polymer having a high hydroxyl value as well as a package of flatting agents comprising a particular weight ratio of a polysiloxane and an acrylics polymer will produce polyurethane topcoat having desired flatting performance and the coating from the PU topcoat has excellent gloss and distinctness of image (DOI).

It is known that gloss and DOI both are parameters for reflecting the surface smoothness of coating, which mainly is affected by flatting performance of coating composition. It is a conventional way to add a flatting agent to a coating composition in order to improve its flatting performance.

It has been surprisingly found by the inventors that incorporation of polyester having a low hydroxyl value and a low viscosity into the film-forming resin composition may significantly improve its flatting performance without impairing adhesion of topcoat to its underlying coating. It has been also surprisingly found by the inventors that incorporation of a particular weight ratio of a polysiloxane and an acrylics polymer into the film-forming resin composition may result in more preferred flatting performance. The thus formed coating has a gloss of at least 85%, even 88% or more at 20° and a DOI of at least 0.85, even up to 0.89, which is much superior to the conventional industrial paint, and even close to vehicle topcoat.

It has been further surprisingly found by the inventors that incorporation of a solvent mixture having a gradient volatile rate into the film-forming resin composition will be favorable to increase its flatting performance.

The details of one or more embodiments of the invention will be set forth in description below. The other features, objectives, and advantages of the invention will become apparent.

Selected Definitions

As used herein, "a", "an", "the", "at least one", and "one or more" are used interchangeably, unless indicated otherwise. Thus, for example, a coating composition that comprises "an" additive can be interpreted to mean that the coating composition includes "one or more" additives.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not specifically mentioned in this disclosure, as long as such components or steps do not affect the basic and novel characteristics of the invention, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

The term "distinctness of image (DOI)" as used herein refers to a parameter for characterizing surface smoothness of a coating. In the field of industrial paint, a coating usually has a DOI of at most 0.80.

The term "solubility parameter" as used herein refers to a parameter for characterizing compatibility among polymers. The closer the solubility parameters among polymers are, these polymers have better compatibility. The "solubility parameter" may be measured by technical experiments such as viscometry or calculated by Small equation.

In an embodiment of the present disclosure, the solubility parameter of a polymer may be estimated by using the following Small equation $$\delta = \rho \Sigma F_i/M,$$

in which
$\delta$ is solubility parameter of the polymer in $(J/cm^3)^{1/2}$
$\rho$ is density of the polymer in $g/cm^3$,
$F_i$ is molar gravitational constant of groups or atoms present in the repetitive structural unit of the polymer in $(J \cdot cm^3)^{1/2}/mol$; and
M is the molecular weight of the repetitive structure unit in g/mol.

As used in the context of "polysiloxane" as a flatting agent, the term "effective silicon content" refers to the amount of polydimethylsiloxane moiety contained in the polysiloxane flatting agent.

The term "hydroxyl value" as used herein refers to the amount in mg of KOH that is equivalent to the content of hydroxyl group in one gram of sample. In an embodiment of the present disclosure, the hydroxyl value is determined according to GB12009.3-2009 by titrimetry.

As used in the context of "film forming resin composition", the phrase "substantially free" of styrene, means that the film-forming resin composition of the present disclosure contains less than 1,000 parts per million (ppm) of styrene. The phrase "essentially free" of styrene means that the film-forming resin composition contains less than 100 parts per million (ppm) of styrene. The phrase "essentially completely free" of styrene means that the film-forming resin composition contains less than 5 parts per million (ppm) of styrene. The phrase "completely free" of phrase means that the film-forming resin composition contains less than 20 parts per billion (ppb) of styrene.

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

DETAILED DESCRIPTION

The present disclosure provides a two-component polyurethane topcoat, comprising a) a film-forming resin composition comprising i) an active hydrogen-containing polymer, having a hydroxyl value of 70 mg KOH/g polymer or more; ii) a polyester resin, having a hydroxyl value of less than 50 mg KOH/g resin and a viscosity of less than 6000 mPa·s at 25° C.; and iii) a package of flatting agents comprising a polysiloxane containing an effective silicon content of 30 wt % or more and an acrylics polymer having a weight average molecular weight in the range of 6,000 to 20,000 g/mol, wherein the weight ratio of the polysiloxane to the acrylics polymer is in the range of 1:5 to 1:15; and b) a polyisocyanate curing agent, wherein the ratio by weight of the component a) to the component b) is in the range of 100:10 to 100:25.

Film-Forming Resin Composition

As used herein, the term, "film-formation resin composition", refers to a resin composition which constructs the bulk of a coating to be formed from the two-component polyurethane topcoat of the present disclosure, which may comprise an active hydrogen-containing polymer, a polyester resin, a flatting package, solvents, and optionally additional additives. Preferably, the film-forming resin composition comprises, based on the total weight of the film-forming resin composition, 10 to 85 wt % of the active hydrogen-containing polymer, 5 to 85 wt % of the polyester resin; and 0.1 to 5 wt % of the package of flatting agents.

According to the present disclosure, as used herein, the term, "active hydrogen-containing polymer", unless specified otherwise, is intended to refer to any polymer originally containing functional groups capable of offering active hydrogen. The active hydrogen is well known for its reactivity with an isocyanate group, and may be donated by many functional groups such as —COOH, —OH, —SH, secondary amino, and primary amino. In an embodiment of the present disclosure, the active hydrogen is donated by hydroxyl group.

Preferably, the active hydrogen-containing polymer has a hydroxyl value of 80 mg KOH/g polymer or more, preferably 90 mg KOH/g polymer or more, more preferably 100 mg KOH/g polymer or more. Taking into account practice application, the hydroxyl value of the active hydrogen-containing polymer would better not to be too high, for example not greater than 150 mg KOH/g polymer, preferably no greater than 120 mg KOH/g polymer. It has been observed that incorporation of an active hydrogen-containing polymer having too high hydroxyl value may negatively affect the mechanical performance of the coating to be formed.

According to the present disclosure, the active hydrogen-containing polymer is used to provide a resin component for the film-formation resin composition and hence the two-component polyurethane topcoat. On the one hand, this resin component functions as a binder which provides adhesion to a substrate or its underlying coating for the polyurethane topcoat and holds together other components, such as pigment, in the film-formation resin composition to impart basic cohesive strength to the coating. On the other hand, this resin component has good reactivity with the polyisocyanate curing agent to achieve crosslinking of the polymeric chains, thereby forming a coating having suitable mechanical strength.

Preferably, the active hydrogen-containing polymer has a viscosity of at least 4,000 mPa·s, preferably at least 6,000 mPa·s, more preferably at least 6,500 mPa·s, even more preferably at least 8,000 mPa·s at 25° C. There is no particular limitation on the upper limit of the viscosity of the active hydrogen-containing polymer. Taking into account actual application, the viscosity of the active hydrogen-containing polymer is preferably no greater than 20,000 mPa·s@25° C., more preferably no greater than 10,000 mPa·s@25° C. The viscosity may be determined with Brookfield viscosimeter using No. 3 spindle at about 10 rpm. It has been observed that above viscosity range results in two-component polyurethane topcoat having suitable applicability.

Preferably, the active hydrogen-containing polymer has a weight average molecular weight of 10,000 g/mol or more, a weight average molecular weight of 15,000 g/mol or more, a weight average molecular weight of 20,000 g/mol or more, a weight average molecular weight of 30,000 g/mol or more, preferably 35,000 g/mol or more, more preferably 40,000 g/mol or more, even more preferably 50,000 g/mol or more. There is no particular limitation on the upper limit to the weight average molecular weight of the active hydrogen-containing polymer. Taking into account actual application, the weight average molecular weight of the active hydrogen containing polymer is preferably no greater than 100,000 g/mol. The weight average molecular weight may be determined by GPC. It has been observed that the active hydrogen containing polymer having higher weight average molecular weight results in two-component polyurethane topcoat having higher mechanical strength.

Preferably, the active hydrogen containing polymer has a solid content in the range of about 60% to about 90%, preferably in the range of about 65% to about 85% wherein the solid content is understood as the weight ratio of non-volatile components in the active hydrogen containing polymer. In particular, the active hydrogen containing polymer has a solid content of about 67.5%, about 70.0%, about 72.5%, about 75.0%, about 77.5%, about 80.0% or about 82.5%.

In an embodiment of the present disclosure, the active hydrogen containing polymer comprises an acrylics polymer having a hydroxyl group.

The active hydrogen containing polymer as disclosed in the present disclosure may be prepared by polymerization process which is well-known by those skilled in the art, for example emulsion polymerization. Alternatively, as an example of the active hydrogen containing polymer, any suitable commercial product may be used, for example AP-541 available from Jiadian Resin Company, Suzhou, China.

According to the present disclosure, the film-forming resin composition, relative to the total weight of the film-forming resin composition comprises about 10 wt % to about 85 wt %, preferably from about 20 wt % to about 75 wt % of the active hydrogen containing polymer. In particular, the film-forming resin composition relative to the total weight of the film-forming resin composition comprises about 25 wt %, about 30 wt %, about 35 wt %, about 40 wt %, about 45 wt %, about 50 wt %, about 55 wt %, about 60 wt % or about 65 wt % of the active hydrogen containing polymer.

According to the present disclosure, a polyester polymer is used together with above active hydrogen containing polymer to constitute the resin component of the film-forming resin composition. The term "polymer polymer" as used herein is understood as an oligomer or polymer containing at least one —C(O)O— ester group in its molecular backbone, which oligomer or polymer may be prepared for example by condensing polyacid or polyanhydride with polyols or bisphenol at a suitable esterification condition.

According to the present disclosure, the polyester resin has a hydroxyl value of less than 50 mg KOH/g resin and a viscosity of less than 3500 mPa·s at 25° C. Preferably, the polyester resin has a lower hydroxyl value and preferably has a hydroxyl value less than 45 mg KOH/g resin, more preferably less than 40 mg KOH/g resin, still more preferably less than 30 mg KOH/g resin, even more preferably less than 20 mg KOH/g resin. The polyester resin for example having a hydroxyl value of about 10 mg KOH/g resin or less may be used. Introduction of the polyester resin having such low hydroxyl value is regarded not to bring about a substantial effect on the curing performance of the polyurethane topcoat. Moreover it is preferred that the polyester resin has a lower viscosity, preferably less than 5500 mPa·s, more preferably less than 5000 mPa·s, still more preferably less than 4500 mPa·s, even more preferably less than 4000 mPa·s, most preferably in the range of 2500 to 3000 mPa·s at 25° C. The viscosity may be determined with Brookfield viscosimeter using No. 3 spindle at about 10 rpm.

It has been surprisingly found by the inventors that the resin component of the film-forming resin composition formed by combining above polyester resin with the active hydrogen containing polymer significantly strength wettability performance of the composition to substrate and thus significantly improve the flatting performance of the PU topcoat. Moreover, adhesion of the resin composition to substrate or its underlying coating is further improved without disadvantageous influence.

Preferably, the polyester resin has a weight average molecular weight in the range of 15000 to 20000 g/mol. The weight average molecular weight may be determined by GPC. It has been observed that the polyester resin falling into above range results in two-component polyurethane topcoat having higher mechanical strength.

Preferably, the polyester resin has a solid content in the range of about 70% to about 90%, preferably in the range of about 75% to about 90% wherein the solid content is understood as the weight ratio of non-volatile components in the polyester resin. In particular, the polyester resin has a solid content of about 77.5%, about 80.0%, about 82.5%, about 85.0% or about 87.5%.

The polyester resin as disclosed in the present disclosure may be prepared by polymerization process which is well-known by those skilled in the art. Alternatively, as example of polyester resin, any suitable commercial product may be used, for example AK1188P polyester resin available from Valspar, USA.

According to the present disclosure, the film-forming resin composition, relative to the total weight of the film-forming resin composition comprises about 10 wt % to about 85 wt %, preferably from about 10 wt % to about 55 wt % of the polyester resin. In particular, the film-forming resin composition relative to the total weight of the film-forming resin composition comprises about 12.5 wt %, about 15 wt %, or about 20 wt % of the polyester resin.

In a preferred embodiment of the present disclosure, the polyester resin is compatible with the active hydrogen containing polymer well. Preferably, the difference between solubility parameter of the active hydrogen-containing polymer and solubility parameter of the polyester resin is less than 0.5 $(J/cm^3)^{1/2}$. More preferably, the difference between solubility parameter of the active hydrogen-containing polymer and solubility parameter of the polyester resin is less than 0.1 $(J/cm^3)^{1/2}$. It has been surprisingly found by the inventors that incorporation of the polyester resin that has a good compatibility with the active hydrogen containing polymer into the film-forming resin composition may further improve wettability of the resin composition to the substrate or primer, thereby increasing the flatting property of polyurethane topcoat.

According to the present disclosure, the film-forming resin composition further comprises a package of flatting agents. The term "flatting agent" as used herein refers to an agent capable of promoting resin composition to form a flat coating without folding, comprising but not limited to a polysiloxane, an acrylics polymer or the combination thereof. In embodiments of the present disclosure, the film-forming resin composition comprises a package of flatting agents comprises the combination of polysiloxane and acrylics polymer.

In the context of the present disclosure, "polysiloxane" refers to an agent that is capable of decreasing the surface tension of coating composition so that the coating composition may flow effectively along the substrate or its underlying coating and thus may smooth the surface defects contained in the substrate or underlying coating. The term "polysiloxane" as used herein refers to a polymer containing —Si—O— structural unit in its molecular backbone.

In an embodiment of the present disclosure, the polysiloxane has the structure of formula I:

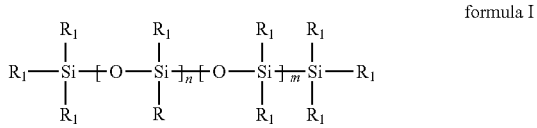

formula I in which

R$_1$ is at each occurrence independently selected from the group consisting of C$_1$-C$_6$ alkyl, preferably methyl;

R represents a polyether residue or a polyester residue, preferably polyester residue;

the sum of m and n is an integer in the range of 30 to 250; and the ratio of m to n is in the range of 3:7 to 9:1.

In a preferred embodiment of the present disclosure, the polysiloxane comprises polyester modified polysiloxane. It has been observed that incorporation of above polysiloxane into the film-forming resin composition of the present disclosure as one of flatting agents would be particularly favorable.

Preferably, polysiloxane has an effective silicon content of 40 wt % or more, preferably of 50 wt % or more, more preferably 60 wt % or more, still more preferably 65 wt % or more, even more preferably 70 wt % or more, still even more preferably 75 wt % or more. According to the present disclosure, polysiloxane having higher effective silicon content would be particularly advantageous. Taking into account practice, the effective silicon content would better not to be too high, for example no greater than 99 wt %, preferably no greater than 95 wt % and more preferably no greater than 90 wt %. It has been found by the inventors that if the effective silicon content is too low, the polysiloxane flatting agent will not sufficient to decrease the surface tension of coating composition so that the coating composition would not flow effectively along the substrate and thus its underlying coating.

The polysiloxane flatting agent as disclosed in the present disclosure may be prepared by the method which is well-known by those skilled in the art, for example by modifying polysiloxane with polyester. Alternatively, as an example of polysiloxane flatting agent, any suitable commercial product may be used, for example DC56 or DC57 polysiloxane available from Dow Corning, USA.

In the context of the present disclosure, "acrylics polymer" refers to an agent that has limited compatibility with other resin components and is capable of migrating to the coating surface to form a new film layer. The term "acrylics polymer" as used herein refers to poly(meth)acrylate homopolymer or copolymer.

The molecular weight of the acrylics polymer is known to affect its compatibility with other resin components of film-forming resin composition. According to the present disclosure, the acrylics polymer as flatting agent may have a weight average molecular weight in the range of 6000 to 20000 g/mol, preferably in the range of 8000 to 12000 g/mol. The weight average molecular weight may be determined by GPC. If the weight average molecular weight of the acrylics polymer is too high, its compatibility with other components will be poor so that it cannot disperse the coating surface homogeneously. If the weight average molecular weight of the acrylics polymer is too low, the film from the coating composition containing the acrylics polymer will have poor durability. Acrylics polymer having such molecular weight range has good flatting performance.

The acrylics polymer flatting agent as disclosed in the present disclosure may be prepared by the method which is well-known by those skilled in the art, for example by homopolymerizing acrylates monomers. Alternatively, as example of acrylics polymer flatting agent, any suitable commercial product may be used, for example EFKA 3777, EFKA 3772, EFKA 3600 or EFKA 3500 from Ciba.

According to the present disclosure, the weight ratio of polysiloxane flatting agent to acrylics polymer flatting agent may be in the range of 1:5 to 1:15, preferably in the range of 1:5 to 1:10 and more preferably in the range of 1:5 to 1:8. In the film-forming resin composition of the present disclosure, the combination of polysiloxane flatting agent and acrylics polymer in such weight ratio as flatting agent will result in the two-component polyurethane topcoat having even more superior flatting property. The thus formed coating may have a gloss of at least 85%, even 88% or more at 20°, and DOI of at least 0.85 and even up to 0.89, which is much superior to conventional industrial paint and even close to vehicle finish. It has been surprisingly found by the inventors that the weight ratio of polysiloxane flatting agent to acrylics polymer flatting agent would also affect the flatting performance of PU topcoat. Relative to the weight of polysiloxane flatting agent, too high or low amount of acrylics flatting agent will result in the PU topcoat having poor flatting performance.

Optionally, the film-forming resin composition further comprises a mixture of solvents each of which has a relative volatile rate in the range of 0.4 to 1.0, relative to butyl acetate. Solvent as used herein is any known solvents suitable for coating composition including but not limited to aliphatic hydrocarbons, aromatic hydrocarbons, terpenes, alcohols, ketones, esters, alcohol ethers, ester ethers, substituted hydrocarbons or any combination thereof. Preferably, solvent comprises esters, aromatic hydrocarbons, ester ethers, substituted hydrocarbons or the combination thereof.

In an embodiment of the present disclosure, the solvent mixture comprises, relative to the total weight of the solvent mixture, 0-55 wt % of butyl acetate; 0-30 wt % of xylene, 0-20 wt % of propylene glycol methyl ether acetate; and 0-15 wt % of 150# solvent oil, preferably 0.1-55 wt % of butyl acetate; 0.1-30 wt % of xylene, 0.1-20 wt % of propylene glycol methyl ether acetate; and 0.1-15 wt % of 150# solvent oil.

According to the present disclosure, the film-forming resin composition may further comprise one or more conventional additives for the polyurethane topcoat that do not adversely affect the coating composition or coating obtained therefrom. Suitable additives include, for example, those that can be used to improve the processability or manufacturability of the composition, enhance composition aesthetics, or improve a particular functional property or characteristic of the coating composition or the cured composition resulting therefrom, such as adhesion to a substrate. Suitable examples of the additive include pigments, anti-migration aids, anti-microbials, chain-extenders, lubricants, biocides, plasticizers, defoamers, colorants, waxes, anti-oxidants, adhesion promoters, UV stabilizers, or combinations thereof. Each optional ingredient can be included in a sufficient amount to serve its intended purpose, but preferably not in such an amount to adversely affect the coating composition or cured coating obtained therefrom. In a preferred embodiment, the film-forming resin composition according to the present disclosure may comprise a pigment, a defoamer, a bactericide, a fungicide, or any combination thereof. According to the present disclosure, the total amount of the conventional additives is in the range of from about 0.1 to about 15% by weight relative to the total weight of the film-forming resin composition.

In a preferred embodiment of the present disclosure, the film-forming resin composition comprises, relative to the total weight of the film-forming resin composition, 10 to 85 wt % of the active hydrogen-containing polymer; 10 to 85 wt % of the polyester resin; 0.1 to 0.5 wt % of the polysiloxane; 0.1 to 4.9 wt % of the acrylics polymer; 0.1 to 20 wt % of the mixture of solvents; and 0-15 wt % of the additional additives.

According to the present disclosure, the preparation of the film-forming resin composition may be achieved by any suitable mixing process that is known to those skilled in the art. For example, the film-forming resin composition can be prepared by adding to vessel an active hydrogen containing polymer, a polyester resin, polysiloxane, an acrylics polymer, a solvents mixture and additional additives if any and mixing the mixture to be homogenous.

In embodiments of the present disclosure, the film-forming resin composition is substantially free of styrene, preferably essentially free of styrene, more preferably essentially completely free of styrene and even more preferably completely free of styrene.

Curing Agent

As used herein, the term, "polyisocyanate curing agent", is intended to refer to a poly-isocyanate compound, an isocyanate prepolymer, or a combination thereof. The polyisocyanate curing agent has two or more isocyanate functionalities, and is capable of reacting with the active hydrogen-containing polymer to achieve chain extension and crosslinking, thereby allowing the three-dimensional network structure to be formed in the coating.

Suitable polyisocyanate curing agent comprises aliphatic polyisocyanates, aromatic polyisocyanates, or any combination thereof. As used herein, the term, "aliphatic polyisocyanates", is intended to refer to any polyisocyanate compound having isocyanate groups directly attached to an aliphatic chain or ring. As used herein, the term, "aromatic polyisocyanates", is intended to refer to any polyisocyanate compound having isocyanate groups directly attached to an aromatic ring.

As examples of suitable polyisocyanate compounds, hexamethylene diisocyanate, dodecamethylene diisocyanate, cyclohexene-1,4-diisocyanate, 4,4'-dicyclohexene methane diisocyanate, cyclopentene-1,3-diisocyanate, p-phenylene diisocyanate, toluene-2,4-diisocyanate, naphthalene-1,4-diisocyanate, diphenyl-4,4'-diisocyanate, benzene-1,2,4-triisocyanate, xylylene-1,4-diisocyanate, xylylene-1,3-diisocyanate, diphenylene methane diisocyanate, butane-1,2,3-triisocyanate, or polymethylene polyphenyl isocyanate can be used. As an example of suitable polyisocyanate compound, N-3390 from Bayer, German may be used.

As examples of suitable isocyanate prepolymer, polyurethane based prepolymer of any of the polyisocyanate compounds as given above, polyester based prepolymer of any of the polyisocyanate compounds as given above, and polyether based prepolymer of any of the polyisocyanate compounds as given above can be used. The polyurethane based prepolymer, the polyester based prepolymer or the polyether based prepolymer may be prepare by any suitable method well known to a person skilled in the art. For example, the polyurethane based prepolymer may be prepared by reacting a monomeric polyol with one or more of the polyisocyanate compounds under suitable conditions; the polyester based prepolymer or the polyether based prepolymer may be prepared by reacting polyester polyol or polyether polyol with one or more of the polyisocyanate compounds under suitable conditions. Alternatively, as the polyurethane based prepolymer, the polyester based prepolymer or the polyether based prepolymer, any suitable commercial available product can be used, for example, N-75 from BASF, Germany, or TPA-90 from ASAHIKA-SEI, Japan.

In a preferred embodiment of the present disclosure, the polyisocyanate curing agent may be diphenyl methane diisocyanate monomer, polymethylene polyphenyl isocyanate, polyether based diphenyl methane diisocyanate prepolymer, polyester based diphenyl methane diisocyanate prepolymer, or any combination thereof. In a further preferred embodiment of the present invention, polymethylene polyphenyl isocyanate, polyether based diphenyl methane diisocyanate prepolymer or polyester based diphenyl methane diisocyanate prepolymer is used.

According to the present disclosure, the weight ratio of the film-formation resin composition to the multi-isocyanate hardener is within the range of 100:10 to 100:25. In general, when the weight ratio of the polyisocyanate curing agent to the film-formation resin composition is less than 10:100, then the curing performance of the resulting coating is insufficient. In general, when the weight ratio of the polyisocyanate curing agent to the film-formation resin composition is greater than 25:100, then the processability of the two-component polyurethane topcoat and/or the mechanical properties of the resulting coating may be degraded. According to actual demands, during the preparation process of the film-forming resin composition and/or the polyisocyanate curing agent, additional inert diluent may be added which will not affect the reactivity of the above film-forming resin composition and polyisocyanate curing agent, such as to reduce the viscosity of the components. Therefore, the weight ratio of the film-forming resin composition and the polyisocyanate curing agent is not limited to the above range, and can be adjusted according to actual demand.

According to the present disclosure, two-component polyurethane topcoat can be prepared by simply mixing the film-forming resin composition with the polyisocyanate curing agent in a mixing device at a predetermined weight ratio before application. The resulting polyisocyanate topcoat can be applied in a variety of ways that are familiar to those skilled in the art, including spraying (e.g., air assisted, airless or electrostatic spraying), brushing, rolling, flooding and dipping. In an embodiment of the present disclosure, the resulting polyurethane topcoat is coated by spraying. The polyurethane topcoat can be applied in various wet film thickness. In an embodiment of the present disclosure, the polyurethane topcoat is applied in such a wet film thickness that the formed coating has a dry thickness preferably from about 13 to about 260 m (about 0.5 to about 10 mils) and more preferably from about 25 to about 75 m (about 1 to about 3 mils). The applied paint may be cured by air drying or by accelerating drying with various drying devices (e.g., ovens) that are familiar to those skilled in the art.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples are commercially available and used directly without further treatment.

Test Methods

Adhesion is measured according to GB/T 9779-2005.
Hardness is measured by pencil hardness measuring apparatus according to GB/T 6739.
Gloss is measured according to GB/T 1743-1989.
Distinctness of image (DOI) is measured by Dorigon DOI measuring apparatus according to ASTM D5767.

TABLE 1

| | Materials used for various examples | | |
|---|---|---|---|
| Item | Materials | Supplier | Description |
| 1 | AP-451 | Jiadian resin Inc, Suzhou, China | Hydroxyl acrylate polymer |
| 2 | AK1188P | Valspar, USA | Polyester resin |
| 3 | DC56 | Dow Corning, Japan | Polysiloxane flatting agent |
| 4 | EFKA 3777 | BASF, Germany | Acrylics polymer flatting agent |
| 5 | N-3390 | Bayer, Germany | polymethylene polyphenyl polyisocyanate curing agent |
| 6 | 139# yellow | Glarent, Germany | Organic pigment |
| 7 | Butyl acetate | General chemicals | Solvent |
| 8 | Xylene | General chemicals | Solvent |
| 9 | Propylene glycol methyl ether acetate | General chemicals | Solvent |
| 10 | 150# solvent oil | General chemicals | solvent |
| 11 | Two-component PU topcoat | PPG | PU Topcoat for control |

Example 1

Preparation of Film-Forming Resin Composition
Preparation of Epoxy Resin Component In a mixing vessel, 450 g of AP-451, 150 g of AK1188P, 250 g of pigment, 2 g of DC-56, 20 g of EFKA 3777 and 50 g of a solvent mixture including 50 wt % of butyl acetate, 25 wt % of xylene, 15 wt % of propylene glycol methyl ether acetate and 10 wt % of 150# solvent oil were added and mixed with stirring at 800-1000 rpm homogeneously, thereby obtaining the present film-forming resin composition.

Preparation of Two-Component Polyurethane Topcoat

Before application, above prepared film-forming resin composition and N3390, i.e. polymethylene polyphenyl polyisocyanate curing agent from Bayer, Germany were mixed in a weight ratio of 100:20.

Coating Formulation

A suitable amount of the present two-component polyurethane topcoat was spray applied onto Duraspar 200 FC epoxy primer available from Valspar, USA so that a coating having a dry film thickness of about 50 micrometers was formed.

As described in testing method, adhesion, hardness, gloss and DOI were measured and listed in the following table 2.

Comparative Example A

A suitable amount of the commercial available two-component polyurethane topcoat from PPG was spray applied onto Duraspar 200 FC epoxy primer available from Valspar, USA so that a coating having a dry film thickness of about 50 micrometers was formed.

As described in testing method, adhesion, hardness, gloss and DOI were measured and listed in the following table 2.

TABLE 2

| Examples | Adhesion | Hardness | Gloss at 20°/60° | DOI |
|---|---|---|---|---|
| Example 1 | 4B | 2H | 88%/96% | 0.88 |
| Comp. Ex A | 5B | H | 78%/90% | 0.7 |

From above results, it can be seen that relative to the conventional polyurethane topcoat comprising an active hydrogen containing polymer as the only film-forming resin and comprising polysiloxane flatting agent alone, the present two-component polyurethane topcoat exhibited superior adhesion to primer coating and hardness and thus formed coating had especially excellent gloss and DOI, even close to the vehicle paints.

While the invention has been described with respect to a number of embodiments and examples, those skilled in the art, having benefit of this disclosure, will appreciate that other embodiments can be devised which do not depart from the scope and spirit of the invention as disclosed herein.

What is claimed:

1. A two-component polyurethane topcoat, comprising:
   a) a film-forming resin composition comprising
      i) an active hydrogen-containing polymer, having a hydroxyl value of 70 mg KOH/g polymer or more;
      ii) a polyester resin, having a hydroxyl value of less than 50 mg KOH/g resin and a viscosity of less than 6000 mPa·s at 25° C.; and
      iii) a package of flatting agents comprising a polysiloxane containing an effective silicon content of 30 wt % or more and an acrylics polymer having a weight average molecular weight in the range of 6,000 to 20,000 g/mol, wherein the weight ratio of the polysiloxane to the acrylics polymer is in the range of 1:5 to 1:15; and b) a polyisocyanate curing agent,
wherein the ratio by weight of the component a) to the component b) is in the range of 100:10 to 100:25.

2. The two-component polyurethane topcoat according to claim 1, wherein the film-forming resin composition comprises, based on the total weight of the film-forming resin composition,
10 to 85 wt % of the active hydrogen-containing polymer;
5 to 85 wt % of the polyester resin; and
0.1 to 5 wt % of the package of flatting agents.

3. The two-component polyurethane topcoat according to claim 1, wherein the active hydrogen-containing polymer has a viscosity of at least 4,000 mPa·s at 25° C.

4. The two-component polyurethane topcoat according to claim 1, wherein the active hydrogen-containing polymer has a weight average molecular weight of 10,000 g/mol or more.

5. The two-component polyurethane topcoat according to claim 1, wherein the polyester resin has a viscosity of 2,500 to 3,000 mPa·s at 25° C.

6. The two-component polyurethane topcoat according to claim 1, wherein the polyester resin has a weight average molecular weight of 15,000 to 20,000 g/mol.

7. The two-component polyurethane topcoat according to claim 1, wherein the difference between solubility parameter of the active hydrogen-containing polymer and solubility parameter of the polyester resin is less than 0.5 $(J/cm^3)^{1/2}$.

8. The two-component polyurethane topcoat according to claim 1, wherein the polysiloxane has an effective silicon content of 60 wt % or more.

9. The two-component polyurethane topcoat according to claim 1, wherein the polysiloxane has the structure of formula I:

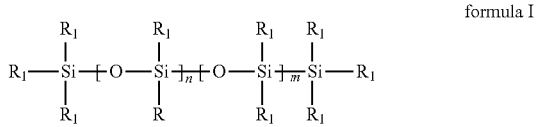

formula I in which
$R_1$ is at each occurrence independently selected from the group consisting of $C_1$-$C_6$ alkyl, preferably methyl;
R represents a polyether residue or a polyester residue;
the sum of m and n is an integer in the range of 30 to 250; and
the ratio of m to n is in the range of 3:7 to 9:1.

10. The two-component polyurethane topcoat according to claim 1, wherein the acrylics polymer has a weight average molecular weight of 8,000 to 12,000 g/mol.

11. The two-component polyurethane topcoat according to claim 1, wherein the active hydrogen-containing polymer comprises a polymer containing one or more of —COOH, —OH, —SH, secondary amino, or primary amino.

12. The two-component polyurethane topcoat according to claim 11, wherein the active hydrogen-containing polymer is selected from an acrylics polymer containing hydroxyl group.

13. The two-component polyurethane topcoat according to claim 1, wherein the film-forming resin composition further comprises a mixture of solvents each of which has a relative volatile rate in the range of 0.4 to 1.0, relative to butyl acetate.

14. The two-component polyurethane topcoat according to claim 13, wherein the mixture of solvents comprises, relative to the total amount of the mixture of solvents,
0-55 wt % of butyl acetate;
0-30 wt % of xylene;
0-20 wt % of propylene glycol methyl acetate; and
0-15 wt % of 150 solvent oil.

15. The two-component polyurethane topcoat according to claim 13, wherein the film-forming resin composition comprises, based on the total weight of the film-forming resin composition,
10 to 85 wt % of the active hydrogen-containing polymer;
10 to 85 wt % of the polyester resin;
0.1 to 0.5 wt % of the polysiloxane;
0.1 to 4.9 wt % of the acrylics polymer; and
0.1 to 20 wt % of the mixture of solvents.

16. The two-component polyurethane topcoat according to claim 1, wherein the polyisocyanate curing agent comprises one or more of aliphatic polyisocyanate, or aromatic polyisocyanate, or any combination thereof.

17. The two-component polyurethane topcoat according to claim 16, wherein the polyisocyanate curing agent comprises one or more of hexamethylene diisocyanate, dodecamethylene diisocyanate, cyclohexene-1,4-diisocyanate, 4,4'-dicyclohexene methane diisocyanate, cyclopentene-1,3-diisocyanate, p-phenylene diisocyanate, toluene-2,4-diisocyanate, naphthalene-1,4-diisocyanate, diphenyl-4,4'-diisocyanate, benzene-1,2,4-triisocyanate, xylylene-1,4-diisocyanate, xylylene-1,3-diisocyanate, diphenylene methane diisocyanate, butane-1,2,3-triisocyanate, polymethylene polyphenyl isocyanate, polyurethane based prepolymer thereof, polyester based prepolymer thereof, or polyether based prepolymer thereof, or any combination thereof.

* * * * *